United States Patent Office 3,328,363
Patented June 27, 1967

3,328,363
VULCANIZATION ACCELERATOR
Harald Blümel, Otto Wiechulla, and Hermann Springmann, all of Marl, Germany, assignors to Chemische Werke Hüls Aktiengesellschaft, Marl, Germany
No Drawing. Filed Dec. 23, 1963, Ser. No. 332,834
Claims priority, application Germany, Jan. 25, 1963, C 28,993
16 Claims. (Cl. 260—79.5)

This invention relates to elastomer technology, particularly of vulcanization accelerators.

It is known that in the vulcanization of elastomers, vulcanization accelerators can be used to increase the speed of vulcanization and to produce better products. These accelerators comprise various classes of chemicals and are generally used together with sulfur, metal oxides, fatty acids and other materials commonly used in the compounding of rubber mixtures, either alone or in admixture therewith.

Known accelerators are, for example, various substituted amines, guanidines, toluidines, aniline derivatives, thiuram sulfides, thiazoles, dithiocarbaminates, sulfenamides, peroxides, metal compounds of the above-named substances, and also the corresponding compounds of selenium and tellurium. The function of these vulcanization accelerators depends on their ability to effect the cross linking of elastomers to produce technically useful vulcanizates within a reasonable time.

The principal object of this invention is to provide a new type of accelerator, particularly one that can be advantageously employed in unusually low concentrations.

Other objects are to provide processes of vulcanization as well as vulcanizable and vulcanized compositions based on the new accelerators.

Upon further study of the specification and claims other objects and advantages of the present invention will become apparent.

To attain the objects of this invention, it has been discovered that compounds of the formula

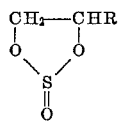

wherein R is hydrogen or a hydrocarbon radical of 1–10, preferably 1–3 carbon atoms, and more preferably alkyl, can be used advantageously as vulcanization accelerators in vulcanizable rubber mixtures, particularly when such mixtures contain metal oxides.

The compounds can be produced by reaction of 1,2-epoxides with sulfur dioxide under pressure of about 20 to 70 atmospheres absolute and at elevated temperature of about 100 to 170° C., and if desired in the presence of a catalyst such as tetraethylene-ammoniumbromide, diethylene-aniline, pyridine.

The above substances are added in only relatively small amounts, ranging from 0.02 to 20%, and preferably from 0.1 to 5%, relative to the amount of elastomer.

Suitable vulcanizable elastomeric mixtures comprise, for example, rubber and equivalent synthetic rubber-like elastomers such as butadiene-styrene polymers, butadiene-acrylonitrile copolymers, polychloroprene, polybutadiene, polyisoprene, butyl-rubber, ethylene-propylene copolymers in saturated or unsaturated condition, halogenated or halosulfonated polyethylenes; fillers such as activated or non-activated carbon black, activated or non-activated silicic acides, silicates, carbonates or sulfates; antioxidants, antiozonants and the like; as well as waxes; fatty acids; plasticizing oils; coloring materials, etc.

The mixtures are produced with masticating mixes like those commonly used in the rubber industry, such as Banbury mixers and rubber mills. The basic mixtures without the vulcanizing ingredients are usually produced at elevated temperatures as well as the completed mixtures which consist of the basic mixtures with some cross-linking agents added therto to serve as vulcanizing agents. These elevated temperatures are in the range of 20° C. to 150° C.

As vulcanizing agents, those substances are included which alone or in admixture with other substances convert the elastomers, in admixture with other ingredients mentioned above, from the non-crosslinked into the crosslinked condition. For this purpose use is generally made of sulfur in its various forms, but also there can be employed selenium, tellurium, polysulfides and similar compounds of selenium and tellurium, polynitroso compounds, quinone derivatives, metal oxides or mixtures thereof such as zinc oxide, magnesium oxide, barium oxide, lead oxide, calcium oxide, etc.

The amount of vulcanizing agent is generally from about 0.1 to 10% by weight, based on the weight of the elastomer.

When sulfur is employed as the vulcanizing agent, it is also advantageous to employ a metal oxide, preferably zinc oxide in an amount equal to about 1 to 20% by weight of the elastomer.

Compared to prior art accelerators, the accelerators of this invention are advantageous with respect to the fact that they can be used in unusually low concentrations which is, of course, a major economic advantage.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

*Example I*

The following mixture is formed in a masticating mixer of 2 liters net volume with the cooling water at 50° C., the mixer being operated at 40 r.p.m.:

TABLE 1

| | Parts |
|---|---|
| Cold rubber, specifically a copolymer of about 23% by weight of styrene with about 77% by weight of butadiene prepared in an aqueous emulsion system at a temperature between 0° to 10° C., by using a free radical catalyst system | 100 |
| Carbon black | 47.5 |
| Aromatic plasticizer oil, specifically one with an average molecular weight between 250 and 500, a viscosity-gravity-constant between 0.88 and 0.99 and a refractive index at 20° C. between 1.52 and 1.58 | 8 |
| N-phenyl-N'-cyclohexyl-p-phenylene-diamine | 1 |
| Ozocerite | 1 |

The mixing time is 10 minutes. The vulcanization materials noted in the following tables were added to the mixture in a laboratory rubber mill. This method of producing the mixture, and the above basic composition, are also applicable to all of the subsequent examples.

The ring and plate formed samples which were obtained after vulcanization in a press at 150° C. and subsequent stamping out were found to have the properties indicated in Table 2 when tested according to the German standardization instructions.

TABLE 2

| Mixture No. | Parts per 100 parts rubber | Ingredients besides those of Table 1 | Vulcanization time in min. | Tensile strength, kg./cm.² | Elongation, percent | Modulus, kg./cm.² 300% | Modulus, kg./cm.² 500% | Perman. elongation, percent | Resistance to tearg., kg./cm. | Hardness, ° Shore | Elasticity, percent 22° C. | Elasticity, percent 75° C. |
|---|---|---|---|---|---|---|---|---|---|---|---|---|
| 1 | 5<br>2<br>5 | ZnO<br>Sulfur<br>Propylene glycol sulfite | 15′ A<br>30′ B<br>60′ C<br>120′ D | 117<br>167<br>189<br>206 | 870<br>775<br>690<br>645 | 25<br>42<br>52<br>64 | 56<br>94<br>122<br>149 | 51<br>33<br>27<br>20 | 16<br>17<br>15<br>14 | 53<br>55<br>57<br>60 | 39<br>39<br>40<br>40 | 42<br>44<br>46<br>47 |

*Example II*

From this example, it will be seen that besides propylene glycol sulfite, homologous compounds are also effective in the same manner.

TABLE 3

| Mixture No. | Parts per 100 parts rubber | Ingredients besides those of Table 1 | Heating time in min. | Tensile strength, kg./cm.² | Elongation, percent | Modulus, kg./cm.² 300% | Modulus, kg./cm.² 500% | Perman. elongation, percent | Resistance to tearg., kg.abs. | Hardness, ° Shore | Elasticity, percent 22° C. | Elasticity, percent 75° C. |
|---|---|---|---|---|---|---|---|---|---|---|---|---|
| 1 | 5<br>2<br>5 | ZnO<br>Sulfur<br>1,2-butylene glycol sulfite | 15′ A<br>30′ B<br>60′ C<br>120′ D | 127<br>186<br>202<br>213 | 795<br>765<br>690<br>645 | 33<br>46<br>57<br>67 | 72<br>107<br>132<br>153 | 41<br>31<br>28<br>23 | 19<br>19<br>18<br>16 | 54<br>55<br>56<br>59 | 38<br>38<br>38<br>38 | 41<br>44<br>44<br>45 |
| 2 | 5<br>2<br>5 | ZnO<br>Sulfur<br>Ethylene glycol sulfite | 15′ A<br>30′ B<br>60′ C<br>120′ D | 118<br>167<br>189<br>193 | 900<br>795<br>730<br>655 | 25<br>40<br>45<br>57 | 53<br>88<br>111<br>133 | 55<br>34<br>28<br>63 | 15<br>17<br>15<br>15 | 51<br>55<br>57<br>60 | 40<br>39<br>39<br>39 | 42<br>44<br>45<br>46 |

*Example III*

The numerical values of the technical properties remain substantially constant within wide concentration ranges, as Table 4 shows.

From this it will be seen that these compounds, in comparison with the previously known vulcanization accelerators, can be used in unusually low concentrations.

*Example IV*

The complete effectiveness of the vulcanization accelerator requires the simultaneous presence of metal oxides. Table 5 shows that an increased amount of zinc oxide produces improved vulcanization, and that instead of zinc oxide, other metallic oxides can be used.

TABLE 4

| Mixture No. | Parts per 100 parts rubber | Ingredients besides those of Table 1 | Heating time in min. | Tensile strength, kg./cm.² | Expans. percent | Modulus, kg./cm.² 300% | Modulus, kg./cm.² 500% | Perman. expansion, percent | Resistance to tearg., kg./cm. | Hardness, ° Shore | Elasticity, percent, 22° C. |
|---|---|---|---|---|---|---|---|---|---|---|---|
| 1 | 5<br>2<br>0.1 | ZnO<br>Sulfur<br>Propylene glycol sulfite | 15′ A<br>30′ B<br>60′ C<br>120′ D | 153<br>184<br>213<br>226 | 835<br>705<br>655<br>600 | 38<br>52<br>68<br>81 | 85<br>121<br>153<br>177 | 35<br>26<br>24<br>20 | 18<br>18<br>16<br>15 | 55<br>56<br>58<br>59 | 39<br>39<br>39<br>39 |
| 2 | 5<br>2<br>0.25 | ZnO<br>Sulfur<br>Propylene glycol sulfite | 15′ A<br>30′ B<br>60′ C<br>120′ D | 144<br>199<br>206<br>220 | 825<br>745<br>635<br>600 | 34<br>50<br>68<br>82 | 80<br>121<br>150<br>176 | 39<br>23<br>23<br>19 | 19<br>18<br>16<br>15 | 55<br>56<br>58<br>59 | 39<br>39<br>39<br>39 |
| 3 | 5<br>2<br>0.5 | ZnO<br>Sulfur<br>Propylene glycol sulfite | 15′ A<br>30′ B<br>60′ C<br>120′ D | 135<br>180<br>202<br>209 | 850<br>775<br>685<br>610 | 33<br>46<br>62<br>74 | 75<br>107<br>135<br>163 | 42<br>35<br>27<br>20 | 19<br>19<br>18<br>15 | 55<br>56<br>56<br>57 | 39<br>40<br>39<br>39 |
| 4 | 5<br>2<br>1 | ZnO<br>Sulfur<br>Propylene glycol sulfite | 15′ A<br>30′ B<br>60′ C<br>120′ D | 113<br>163<br>202<br>220 | 985<br>815<br>715<br>630 | 22<br>35<br>50<br>69 | 53<br>89<br>122<br>161 | 58<br>41<br>30<br>20 | 15<br>17<br>16<br>14 | 53<br>55<br>57<br>60 | 38<br>38<br>38<br>39 |
| 5 | 5<br>2<br>2 | ZnO<br>Sulfur<br>Propylene glycol sulfite | 15′ A<br>30′ B<br>60′ C<br>120′ D | 99<br>162<br>193<br>193 | 855<br>835<br>720<br>600 | 25<br>38<br>52<br>65 | 53<br>88<br>118<br>152 | 56<br>41<br>27<br>20 | 15<br>16<br>16<br>15 | 52<br>55<br>57<br>60 | 39<br>38<br>39<br>40 |
| 6 | 5<br>2<br>4 | ZnO<br>Sulfur<br>Propylene glycol sulfite | 15′ A<br>30′ B<br>60′ C<br>120′ D | 124<br>175<br>195<br>189 | 905<br>825<br>705<br>585 | 29<br>39<br>54<br>67 | 61<br>94<br>124<br>153 | 51<br>33<br>25<br>19 | 15<br>17<br>16<br>13 | 53<br>55<br>56<br>59 | 38<br>38<br>39<br>39 |
| 7 | 5<br>2<br>6 | ZnO<br>Sulfur<br>Propylene glycol sulfite | 15′ A<br>30′ B<br>60′ C<br>120′ D | 106<br>160<br>194<br>203 | 900<br>820<br>750<br>660 | 26<br>39<br>51<br>64 | 55<br>87<br>119<br>144 | 56<br>34<br>31<br>23 | 15<br>16<br>16<br>15 | 51<br>55<br>56<br>60 | 38<br>38<br>39<br>39 |

TABLE 5

| Mixture No. | Parts per 100 parts rubber | Ingredients besides those of Table 1 | Heating time in min. | Tensile strength, kg./cm.$^2$ | Expansion, percent | Modulus, kg./cm.$^2$ 300% | Modulus, kg./cm.$^2$ 500% | Permanent expansion, percent | Resistance to teargo., kg./cm. | Hardness, ° Shore | Elasticity, percent 22° C. | Elasticity, percent 75° C. |
|---|---|---|---|---|---|---|---|---|---|---|---|---|
| 1 | 2 | Sulfur | 15' A | 128 | 905 | 28 | 63 | 52 | 18 | 54 | 39 | 40 |
|  | 5 | ZnO | 30' B | 177 | 815 | 39 | 92 | 36 | 20 | 55 | 40 | 43 |
|  | 5 | Propylene glycol sulfite | 60' C | 185 | 715 | 48 | 114 | 30 | 19 | 56 | 38 | 43 |
|  |  |  | 120' D | 209 | 695 | 57 | 132 | 25 | 17 | 59 | 38 | 45 |
| 2 | 10 | ZnO | 15' A | 153 | 870 | 34 | 77 | 45 | 18 | 55 | 38 | 41 |
|  | 2 | Sulfur | 30' B | 201 | 770 | 50 | 117 | 36 | 19 | 57 | 38 | 43 |
|  | 5 | Propylene glycol sulfite | 60' C | 232 | 685 | 68 | 158 | 22 | 17 | 60 | 37 | 45 |
|  |  |  | 120' D | 231 | 630 | 75 | 169 | 22 | 15 | 60 | 38 | 45 |
| 3 | 5 | PbO | 15' A | 215 | 705 | 58 | 137 | 30 | 20 | 60 | 35 | 45 |
|  | 2 | Sulfur | 30' B | 226 | 545 | 54 | 201 | 15 | 15 | 61 | 43 | 53 |
|  | 5 | Propylene glycol sulfite | 60' C | 214 | 480 | 107 |  | 11 | 13 | 60 | 44 | 53 |
|  |  |  | 120' D | 200 | 475 | 95 |  | 11 | 13 | 60 | 44 | 48 |
| 4 | 5 | BaO | 15' A | 6 | 735 | 6 | 6 | >100 | 1 | 42 | 37 | 32 |
|  | 2 | Sulfur | 30' B | 24 | 865 | 10 | 16 | >100 | 5 | 48 | 36 | 34 |
|  | 5 | Propylene glycol sulfite | 60' C | 95 | 770 | 26 | 56 | 46 | 14 | 54 | 38 | 38 |
|  |  |  | 120' D | 141 | 555 | 53 | 122 | 17 | 18 | 58 | 38 | 43 |
| 5 | 5 | CaO | 15' A | 6 | 500 | 6 | 6 | >100 | 1 | 42 | 39 | 33 |
|  | 2 | Sulfur | 30' B | 6 | 760 | 6 | 6 | >100 | 2 | 45 | 39 | 33 |
|  | 5 | Propylene glycol sulfite | 60' C | 28 | 875 | 9 | 19 | >100 | 5 | 50 | 39 | 35 |
|  |  |  | 120' D | 95 | 715 | 29 | 61 | 45 | 14 | 55 | 40 | 38 |

Results similar to the preceding examples are obtained by replacing the cold rubber of Example 1 with natural rubber or any rubber-like vulcanizable elastomer such as those hereinbefore mentioned.

Similarly, higher homologues of the accelerators of this invention may be beneficially employed, such as 1,2 amylene, 1,2 hexylene, 1,2 heptalyne, 1,2 octylene, 1,2 nonylene, 1,2 decylene, 1,2 undecylene, and 1,2 dodecylene glycol sulfites.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process of vulcanizing a rubber with 0.1–10% by weight based on the weight of the rubber of a vulcanization agent, said rubber being selected from the group consisting of natural rubber and synthetic rubber-like vulcanizable elastomers, the improvement which comprises heating said rubber and vulcanization agent with a vulcanization accelerator of 0.02–20% by weight of the rubber, said accelerator being a compound of the formula:

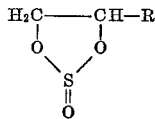

wherein R is selected from the group consisting of hydrogen and alkyl of 1–10 carbon atoms.

2. The process of claim 1, wherein the accelerator is ethylene glycol sulfite.

3. The process of claim 1, wherein the accelerator is propylene glycol sulfite.

4. The process of claim 1, wherein the accelerator is butylene glycol sulfite.

5. The process of claim 1, wherein the vulcanization agent is sulfur and the rubber is vulcanized in the additional presence of a metal oxide selected from the group consisting of zinc oxide, magnesium oxide, lead oxide, barium oxide and calcium oxide.

6. The process of claim 1, wherein the accelerator is employed in an amount of 0.1–5% based on the weight of the rubber.

7. A composition comprising a predominant amount of a rubber selected from the group consisting of natural rubber, and a synthetic, rubber-like, vulcanizable elastomer; 0.1–10% by weight based on the weight of the rubber of a vulcanizing agent; and 0.02–20% by weight based on the weight of the rubber, of a compound of the formula:

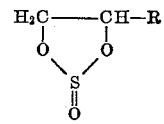

wherein R is selected from the group consisting of hydrogen and alkyl of 1–10 carbon atoms.

8. The composition of claim 7, wherein the accelerator is ethylene glycol sulfite.

9. The composition of claim 7, wherein the accelerator is propylene glycol sulfite.

10. The composition of claim 7, wherein the accelerator is butylene glycol sulfite.

11. The composition of claim 7 wherein the vulcanizing agent is sulfur, and further comprising a metal oxide selected from the group zinc oxide, magnesium oxide, lead oxide, barium oxide and calcium oxide.

12. The composition of claim 7, wherein the accelerator is employed in an amount of 0.1–5% based on the weight of the rubber.

13. A composition as defined by claim 7 wherein the vulcanizing agent is selected from the group consisting of sulfur, selenium, tellurium, polysulfides, polynitroso compounds, quinone derivatives, and metal oxides.

14. A composition as defined by claim 8 wherein the vulcanizing agent is sulfur.

15. A composition as defined by claim 9 wherein the vulcanizing agent is sulfur.

16. A composition as defined by claim 10 wherein the vulcanizing agent is sulfur.

No references cited.

JOSEPH L. SCHOFER, *Primary Examiner.*

D. K. DENENBERG, *Assistant Examiner.*